UNITED STATES PATENT OFFICE.

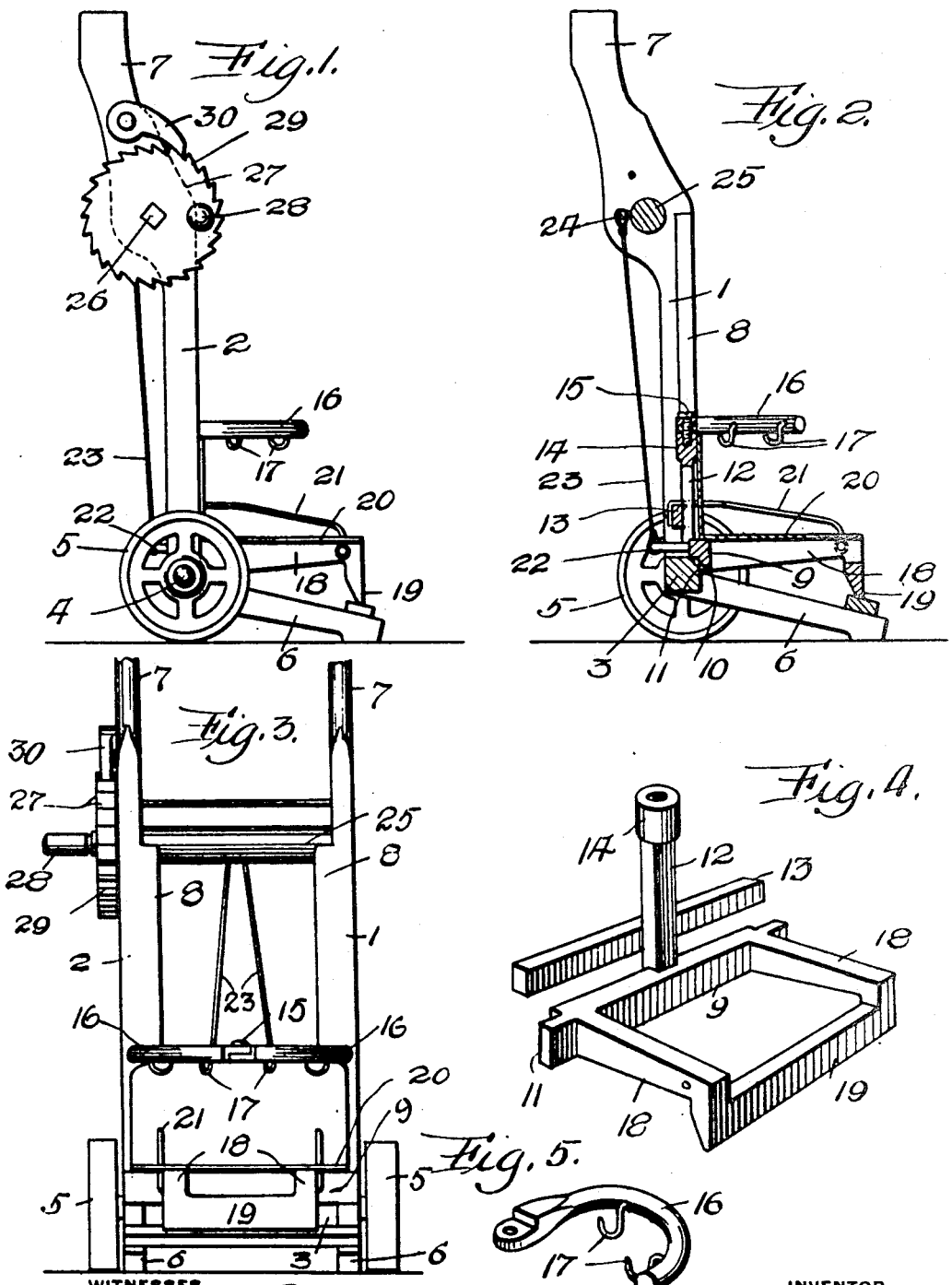

STANISLAW STANCZAK, OF COBALT, ONTARIO, CANADA.

BAG-HOLDER FOR TRUCKS.

1,116,150.  Specification of Letters Patent.  Patented Nov. 3, 1914.

Application filed April 25, 1913. Serial No. 763,530.

*To all whom it may concern:*

Be it known that I, STANISLAW STANCZAK, a subject of the Czar of Russia, residing at Cobalt, Ontario, Canada, have invented certain new and useful Improvements in Bag-Holders for Trucks, of which the following is a specification, reference being had therein to the accompanying drawings.

This invention relates to a bag holder for trucks, and the primary object of my invention is to furnish a truck with a bag holding device that can be raised and lowered relatively to the truck to correctly position a bag and facilitate filling the same.

Another object of this invention is to provide a portable bag holding device that will retain the mouth or open end of the bag open whereby the bag can be easily and quickly filled.

A further object of this invention is to accomplish the above results by a mechanical construction that is durable, inexpensive to manufacture and highly efficient for the purposes for which it is intended.

With the above and other objects in view, the invention resides in a novel construction, combination and arrangement of parts to be hereinafter specifically described and then claimed.

Reference will now be had to the drawing, wherein like numerals denote corresponding parts throughout the several views, in which:—

Figure 1 is a side elevation of a truck in accordance with this invention. Fig. 2 is a vertical sectional view of the same. Fig. 3 is a front elevation of the truck. Fig. 4 is a perspective view of a detached shiftable frame adapted to form part of the truck, and Fig. 5 is a perspective view of the detached bag holding arm.

The reference numerals 1 and 2 denote the side frames of a truck, said frames having the lower ends thereof connected by a transverse axle 3 upon the spindles 4 of which there are mounted wheels 5. The lower ends of the frames 1 and 2 have an angularly disposed support 6 and the upper ends of said frames terminate in handles 7. The confronting sides of the frames 1 and 2 are provided with longitudinal guides 8 and slidably mounted between said guides is a shiftable frame, best shown in Fig. 4. The shiftable frame comprises a back-bar 9 that has the bottom side thereof cut away as at 10 whereby it can easily rest upon the axle 3 as shown in Fig. 2. The ends of the back-bar are cut away as at 11 to provide clearance for the guides 8 of the frames 1 and 2, said back-bar engaging the front side of said guides. The back-bar 9, intermediate the ends thereof has an upright 12 and suitably connected to this upright is a transverse guide-bar 13, the ends of which extend behind the guides 8 of the frames 1 and 2, said guide-bar coöperating with the back-bar 9 in preventing the shiftable frame from becoming accidentally displaced.

The upper end of the upright 12 has a socket 14 and pivotally connected to said socket by a screw 15 or other fastening means are the rear ends of bag holding arms 16. The arms 16 are semi-circular in plan and the confronting sides of bag holding arms have hooks 17 for supporting the upper edges or mouth of a bag. The back-bar 9 has forwardly extending arms 18 connected by a transverse strip 19 adapted to rest upon the support 6. The arms 18 coöperate with the upright 12 in supporting an angle platform 20, preferably made of metal. Connected to the outer sides of the arms 18 are the lower ends of braces 21 that extend through the vertical portion of the platform 20 and are connected to the rear side of the guide-bar 13.

The rear side of the back-bar 9 is provided with staples or pins 22 and connected to said staples are cables 23. The cables 23 have the upper ends thereof connected to a single staple 24, carried by a roller 25 that has the ends thereof journaled in the frames 1 and 2 of the truck. One end of the roller 25 has a rectangular shank 26 and mounted upon said shank is a large hand wheel 27 provided with a handle 28. The periphery of the hand wheel 27 has ratchet teeth 29 that are normally engaged by a gravity pawl 30 pivotally connected to the outer side of the frame 2.

It is through the medium of the roller 25 that the cables 23 can be wound thereon to elevate the shiftable frame relatively to the frames 1 and 2 of the truck. With the shiftable frame in an elevated position, the bag can be readily placed upon the platform 20 and the mouth of the bag maintained in an open position by the arms 16 and the hooks 17. After a bag has been filled that is held by the arms 16 and the platform 20, the platform 20 can be lowered until the back-bar rests upon the axle 3 and the strip 19 upon the support 6. The upper edges of the bag can then be removed from the hooks 17, the bag closed and the filled bag transported by the truck to a desired location. The gravity pawl 30 engaging the hand wheel 27 prevents the roller 25 from unwinding when the cables 23 are wound thereon to retain the shiftable frame in an elevated position.

What I claim is:—

In a bag holder for trucks, a support having a vertically movable frame including a back bar provided with a centrally disposed upright, an angle-shaped platform mounted on said frame, said frame further including a pair of side bars, a transverse disposed strip mounted on said platform and disposed below the planes of the top of said bars and depending below the said side bars, a pair of curved arms pivoted to said uprights, a transverse guide bar secured to the back of said uprights, an angle-shaped platform having braces extending through the vertical portion thereof and being secured to the said guide bar and to the side bars of the frame.

In testimony whereof I affix my signature in the presence of two witnesses.

STANISLAW STANCZAK.

Witnesses:
 SAM DENYLER,
 STANISLAUS KOZIK.

Copies of this patent may be obtained for five cents each, by addressing the "Commissioner of Patents, Washington, D. C."